United States Patent
Lai

(10) Patent No.: US 7,403,192 B2
(45) Date of Patent: Jul. 22, 2008

(54) PORTABLE ELECTRONIC DEVICE

(75) Inventor: Lai-Chen Lai, Taipei County (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 569 days.

(21) Appl. No.: 10/979,610

(22) Filed: Nov. 2, 2004

(65) Prior Publication Data

US 2006/0044281 A1 Mar. 2, 2006

(30) Foreign Application Priority Data

Aug. 27, 2004 (TW) .............................. 93125757 A

(51) Int. Cl.
*G09G 5/00* (2006.01)

(52) U.S. Cl. ........................................ 345/173; 345/1.1

(58) Field of Classification Search ......... 345/156–163, 345/168–169, 172–179, 160, 162, 1.1–1.2; 341/22, 23; 178/18.01–18.02, 19.01–19.02; 715/771, 773, 705
See application file for complete search history.

(56) References Cited

U.S. PATENT DOCUMENTS

| | | | | |
|---|---|---|---|---|
| 5,543,588 A | * | 8/1996 | Bisset et al. | 178/18.06 |
| 5,729,219 A | * | 3/1998 | Armstrong et al. | 341/20 |
| 5,977,867 A | * | 11/1999 | Blouin | 340/407.2 |
| 6,226,176 B1 | * | 5/2001 | Horie et al. | 361/686 |
| 6,396,924 B1 | * | 5/2002 | Suso et al. | 379/433.13 |
| 6,415,165 B1 | | 7/2002 | Ishigami | |
| 6,747,635 B2 | * | 6/2004 | Ossia | 345/169 |
| 6,909,424 B2 | * | 6/2005 | Liebenow et al. | 345/169 |
| 7,088,342 B2 | * | 8/2006 | Rekimoto et al. | 345/169 |
| 7,123,243 B2 | * | 10/2006 | Kawasaki et al. | 345/173 |
| 2002/0077161 A1 | * | 6/2002 | Eromaki | 455/575 |
| 2002/0149561 A1 | * | 10/2002 | Fukumoto et al. | 345/156 |
| 2003/0184528 A1 | * | 10/2003 | Kawasaki et al. | 345/173 |
| 2004/0026136 A1 | * | 2/2004 | Hill et al. | 178/18.01 |

FOREIGN PATENT DOCUMENTS

JP 2004110380 A * 4/2004

* cited by examiner

*Primary Examiner*—Richard Hjerpe
*Assistant Examiner*—Mansour M Said
(74) *Attorney, Agent, or Firm*—Quintero Law Office

(57) ABSTRACT

A portable electronic device. A main body includes a first surface and a second surface opposite thereto. A display screen is disposed on the first surface and is electrically connected to the main body. A touchpad is disposed on the second surface and is electrically connected to the main body and display screen, providing a user to access or deal with data displayed on the display screen.

5 Claims, 3 Drawing Sheets

PORTABLE ELECTRONIC DEVICE

BACKGROUND

The invention relates to a portable electronic device, and in particular to a portable electronic device providing convenient and fast operation.

Referring to FIG. 1, a conventional PDA 1 comprises a main body 11 and a stylus 12. An LCD touch panel 13, a control button 14, and four directional buttons 15 are disposed on the front of the main body 11. Functions are selected and data is input on the LCD touch panel 13 using the stylus 12. In another aspect, function selection or data input can also be performed by pressing or operating the directional buttons 15 and control button 14. Accordingly, operation of the directional buttons 15 allows only four-directional movement on the LCD touch panel 13, thus limiting operational flexibility of the PDA 1.

Referring to FIG. 2, another PDA 2 comprises a main body 21 and a stylus 22. An LCD touch panel 23, a control button 24, and a joystick 25 are disposed on the front of the main body 21. Similarly, functions are selected and data is input on the LCD touch panel 23 using the stylus 22. The joystick 25 allows multidirectional movement, such as eight-directional movement, on the LCD touch panel 23, thereby enhancing operational flexibility of the PDA 2.

Nevertheless, the aforementioned PDAs 1 and 2 have many disadvantages. When operating the PDA 1 or 2 in a dynamic or unstable environment, for example in a moving car, the stylus 12 or 22 cannot precisely perform function selection or data input due to vibration. Additionally, when data is input by the stylus 12 or 22 with one hand, the PDA 1 or 2 must be held with the other hand. The aforementioned operation becomes impossible when a user stands in the moving car. Moreover, although the PDA 1 or 2 can be held with one hand and fingers thereof can be used to operate the directional buttons 15, joystick 25, control button 14, or control button 24 in a dynamic or unstable environment, the directional buttons 15 or joystick 25 can only perform step-by-step movement, making operation inconvenient. Further, since the front of the PDA 1 or 2 (main body 11 or 21) is provided with the directional buttons 15, joystick 25, control button 14, or control button 24, the disposed size of the LCD touch panel 13 or 23 is limited, adversely affecting display thereof.

Hence, there is a need for an improved portable electronic device that provides convenient and fast operation in a dynamic environment and a larger display screen to enhance display thereof.

SUMMARY

Accordingly, an embodiment of the invention provides a portable electronic device comprising a main body, a display screen, and a touchpad. The main body comprises a first surface and a second surface opposite thereto. The display screen is disposed on the first surface and is electrically connected to the main body. The touchpad is disposed on the second surface and is electrically connected to the main body and display screen.

The display screen comprises an LCD touch panel.

The touchpad comprises a linear or nonlinear graphical interface pad.

The portable electronic device comprises a PDA.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
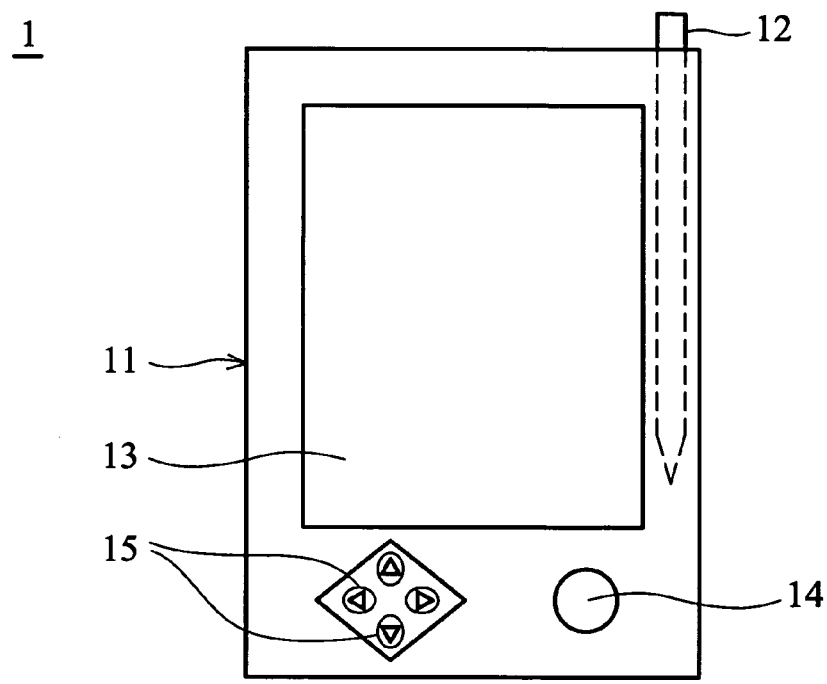
FIG. 1 is a schematic plan view of a conventional PDA.
Figure 2:
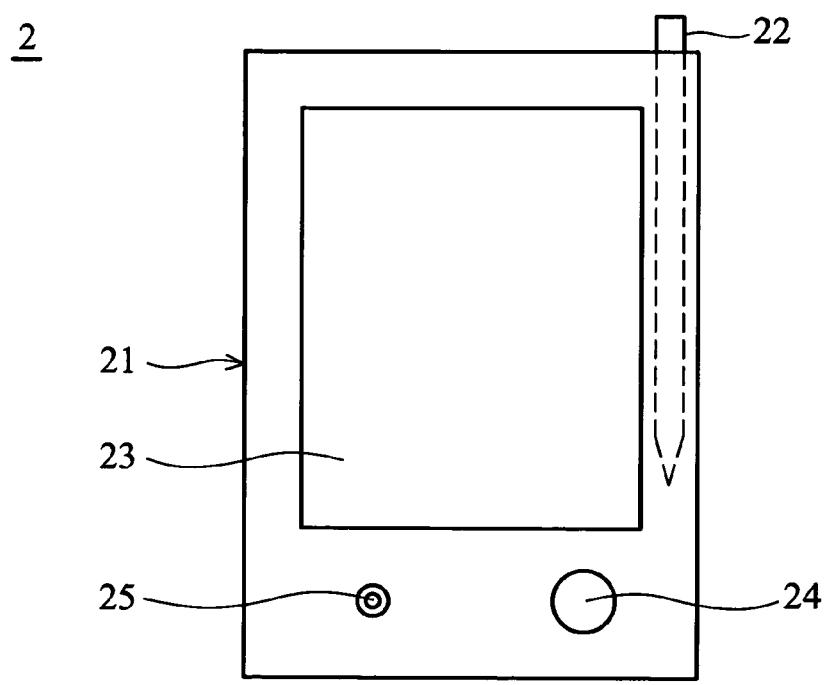
FIG. 2 is a schematic plan view of another conventional PDA.
Figure 3A:
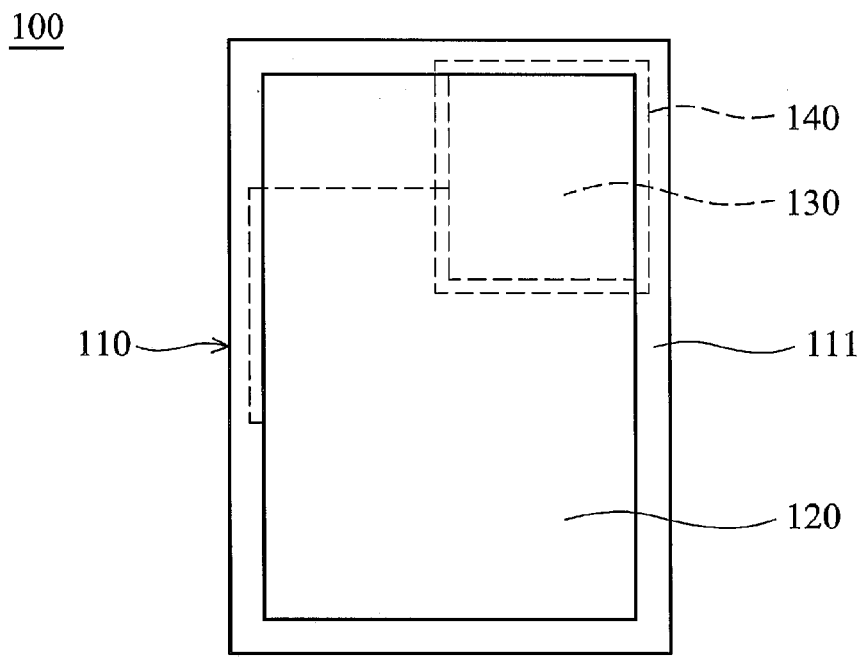
FIG. 3A is a front view of the portable electronic device according to an embodiment of the invention.
Figure 3B:
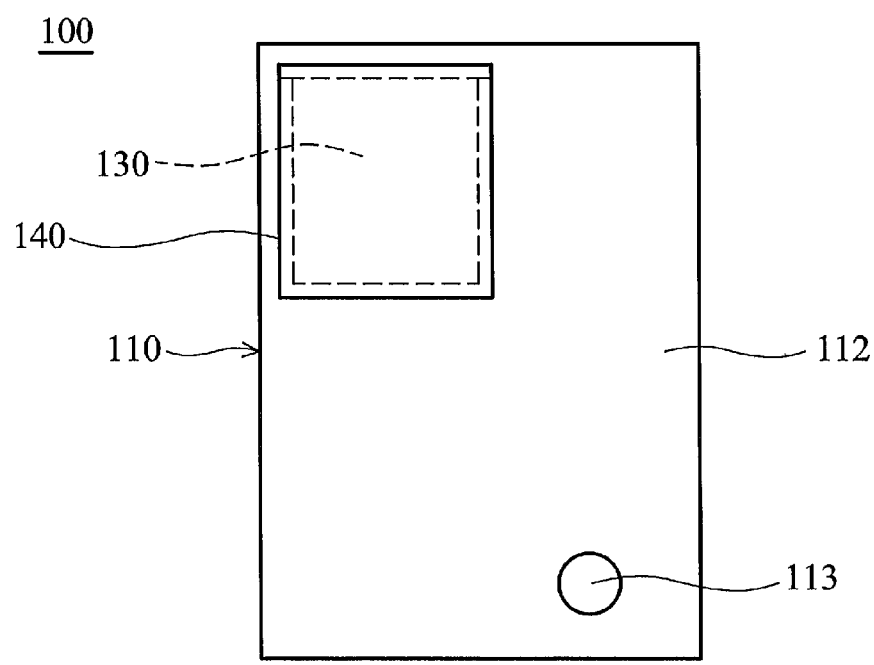
FIG. 3B is a rear view of the portable electronic device according to an embodiment of the invention.

Referring to FIG. 3A and FIG. 3B, the portable electronic device 100 of some embodiments of the invention can be a PDA comprising a main body 110, a display screen 120, and a touchpad 130.

The main body 110 comprises a first surface 111 and a second surface 112 opposite thereto. In some embodiments, the first surface 111 can be the front of the main body 110 while the second surface 112 can be the backside thereof.

The display screen 120 can be an LCD touch panel or an LCD panel and is disposed on the first surface 111 of the main body 110. Additionally, the display screen 120 is electrically connected to the main body 110.

The touchpad 130 is disposed on the second surface 112 of the main body 110 and is electrically connected to the main body 110 and display screen 120.

Figure 4:
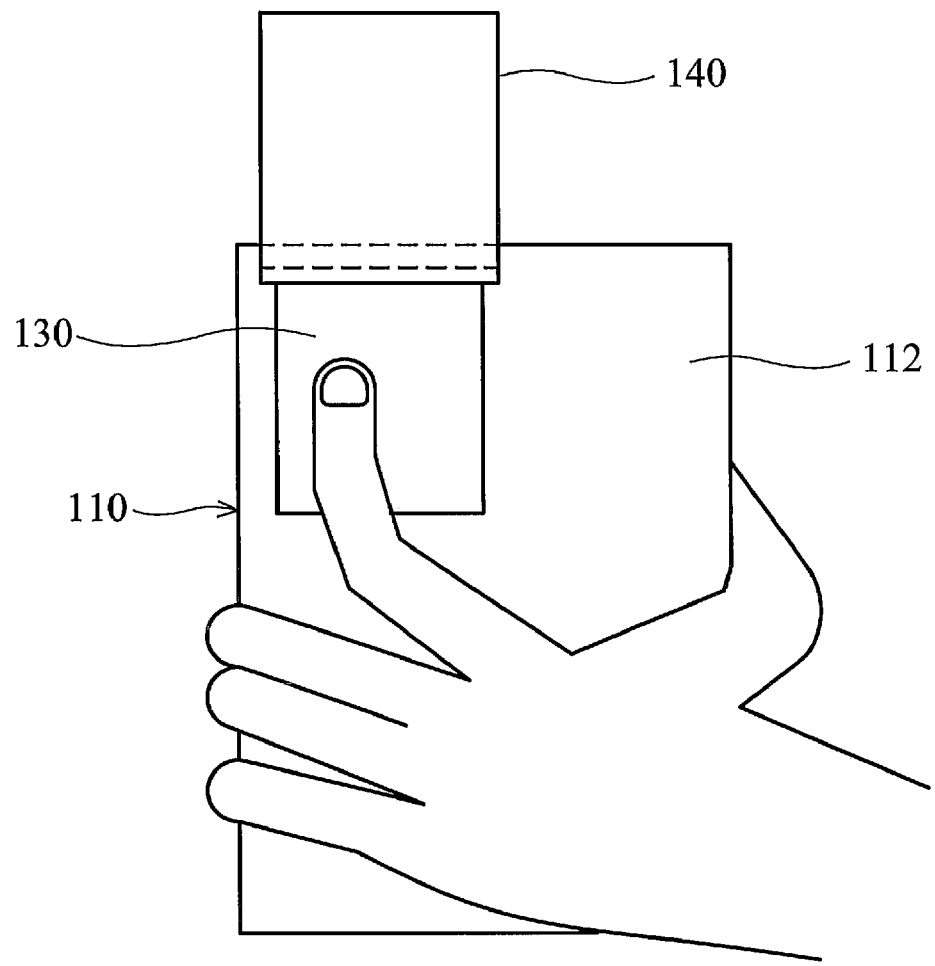
FIG. 4 shows operation of the portable electronic device according to an embodiment of the invention.

Referring to FIG. 4, during operation, the portable electronic device 100 can be held simply by one hand and the display screen 120 disposed on the first surface 111 of the main body 110 thereof faces a user. The user is able to touch or operate the touchpad 130 disposed on the second surface 112 of the main body 110 with one finger of the hand for movement and function selection. The results of the movement and function selection can be displayed on the display screen 120.

Specifically, the touchpad 130 is not limited to a specific type. For example, the touchpad 130 can be a linear or nonlinear graphical interface pad. When the touchpad 130 is a linear graphical interface pad, an object displayed on the display screen 120 can be moved or selected in uniform motion by means of the touchpad 130. Conversely, when the touchpad 130 is a nonlinear graphical interface pad, an object displayed on the display screen 120 can be moved or selected in accelerated motion by means of the touchpad 130. Accordingly, since the touchpad 130 is disposed on the opposite side of the display screen 120, the user perceives the finger moving on the backside of the display screen 120 when operating the touchpad 130. Thus, the touchpad 130 disposed opposite to the display screen 120 provides more user-friendly and instinctive operation.

Moreover, since the basic input interface (touchpad 130) provided by the portable electronic device 100 is disposed on the backside (second surface 112) thereof, the display screen 120 can cover almost the entire first surface 111 of the main body 110. The portable electronic device 100 thus provides better display and is beneficial to display digital images, video images, and other multimedia information.

Moreover, a stylus (not shown) can be selectively and movably disposed in the portable electronic device 100. The user can perform writing on the display screen (LCD touch panel) 120 using the stylus.

The user can perform function selection or data input with a finger touching the display screen 120 (LCD touch panel).

As shown in FIG. 3B, a switch device (switch button) 113 is disposed on the second surface 112 of the main body 110 for enabling or disabling the touchpad 130.

A cover or lid 140 can be selectively disposed on the main body 110 of portable electronic device 100, protecting the touchpad 130 thereof from damage or unexpected touching when the touchpad 130 is not in operation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a main body, with a first surface and a second surface opposite thereto;
   an LCD touch panel disposed on the first surface, wherein the LCD touch panel is operable to both display data and receive user touch input; and
   a touchpad disposed on the second surface, separated from the LCD touch panel, and electrically connected to the LCD touch panel, wherein the touchpad is operable to receive user touch input independently from the LCD touch panel for manipulating data displayed on the LCD touch panel.

2. The portable electronic device as claimed in claim 1, wherein the portable electronic device comprises a PDA.

3. The portable electronic device as claimed in claim 1, further comprising a switch device disposed on the main body for enabling or disabling the touchpad.

4. The portable electronic device as claimed in claim 1, further comprising a cover disposed on the main body, protecting the touchpad from damage or unexpected touching when the touchpad is not in operation.

5. The portable electronic device as claimed in claim 1, wherein the LCD touch panel is disposed on the front side of the main body, and the touchpad is disposed on the backside of the main body.

* * * * *

(12) EX PARTE REEXAMINATION CERTIFICATE (9530th)
United States Patent
Lai

(10) Number: US 7,403,192 C1
(45) Certificate Issued: Feb. 26, 2013

(54) PORTABLE ELECTRONIC DEVICE

(75) Inventor: Lai-Chen Lai, Taipei County (TW)

(73) Assignee: Getac Technology Corp., Hsinchu, Science-Based Industrial Park, Hsinchu (TW)

Reexamination Request:
No. 90/012,019, Nov. 22, 2011

Reexamination Certificate for:
Patent No.: 7,403,192
Issued: Jul. 22, 2008
Appl. No.: 10/979,610
Filed: Nov. 2, 2004

(30) Foreign Application Priority Data

Aug. 27, 2004 (TW) .............................. 93125757 A

(51) Int. Cl.
*G09G 5/00* (2006.01)

(52) U.S. Cl. .......................................... 345/173; 345/1.1
(58) Field of Classification Search ........................ None
See application file for complete search history.

(56) References Cited

To view the complete listing of prior art documents cited during the proceeding for Reexamination Control Number 90/012,019, please refer to the USPTO's public Patent Application Information Retrieval (PAIR) system under the Display References tab.

*Primary Examiner* — Pia Tibbits

(57) ABSTRACT

A portable electronic device. A main body includes a first surface and a second surface opposite thereto. A display screen is disposed on the first surface and is electrically connected to the main body. A touchpad is disposed on the second surface and is electrically connected to the main body and display screen, providing a user to access or deal with data displayed on the display screen.

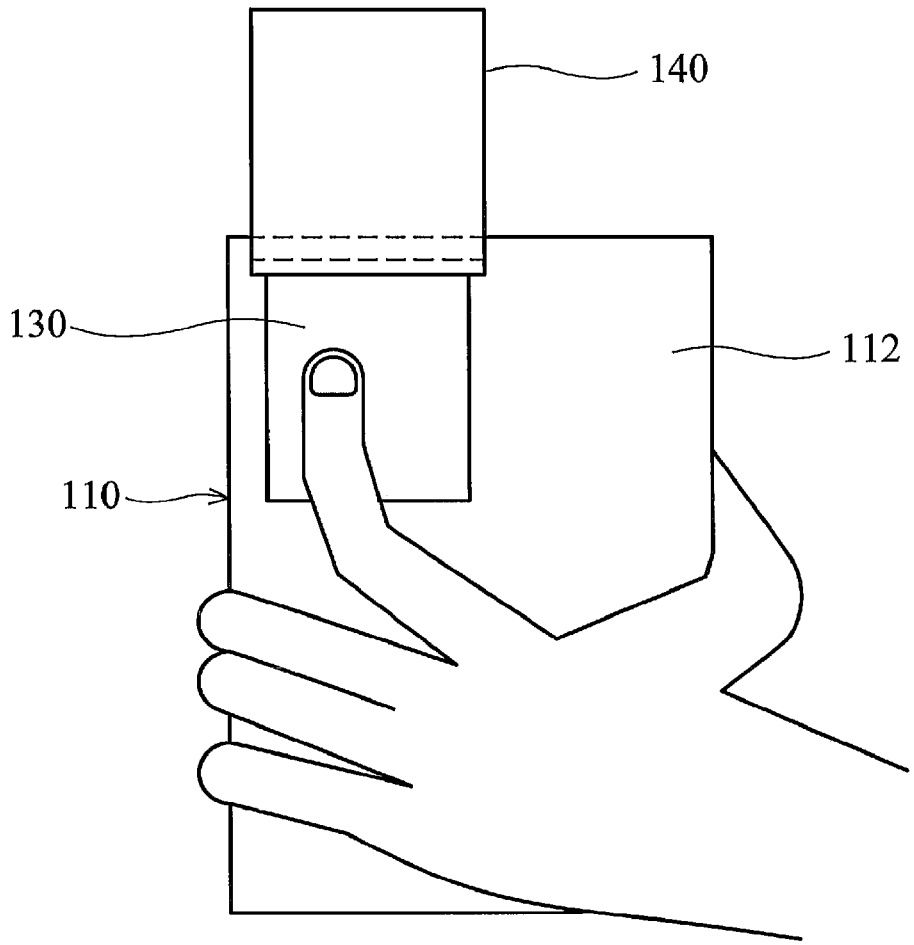

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claim 1 is determined to be patentable as amended.

Claims 2, 4 and 5, dependent on an amended claim, are determined to be patentable.

1. A portable electronic device, comprising:
   a main body, with a first surface and a second surface opposite thereto;
   an LCD touch panel disposed on the first surface, wherein the LCD touch panel is operable to both display data and receive user touch input; [and]
   a touchpad disposed on the second surface, separated from the LCD touch panel, and electrically connected to the LCD touch panel, wherein the touchpad is operable to receive user touch input independently from the LCD touch panel for manipulating data displayed on the LCD touch panel; *and*
   *a switch device disposed on the main body for enabling and disabling the touchpad independently from the LCD touch panel, wherein the touchpad does not receive user touch input when disabled.*

\* \* \* \* \*